(12) United States Patent
Harkcom et al.

(10) Patent No.: US 7,942,748 B2
(45) Date of Patent: May 17, 2011

(54) ANNULAR GROOVE IN A SHOCK PROTECTION DEVICE

(75) Inventors: Melanie W. Harkcom, New Holland, PA (US); David M. DeChristopher, Akron, PA (US)

(73) Assignee: CNH America LLC, New Holland, PA (US)

( * ) Notice: Subject to any disclaimer, the term of this patent is extended or adjusted under 35 U.S.C. 154(b) by 379 days.

(21) Appl. No.: 12/125,229

(22) Filed: May 22, 2008

(65) Prior Publication Data

US 2009/0088260 A1     Apr. 2, 2009

Related U.S. Application Data

(60) Provisional application No. 60/975,943, filed on Sep. 28, 2007.

(51) Int. Cl.
    *F16D 9/00* (2006.01)
(52) U.S. Cl. ............................................. 464/32; 464/33
(58) Field of Classification Search .................... 464/32, 464/33, 182
    See application file for complete search history.

(56) References Cited

U.S. PATENT DOCUMENTS

| | | |
|---|---|---|
| 1,983,007 A | 12/1934 | Simons |
| 2,892,329 A | 6/1958 | Trigilio |
| 2,964,931 A | 12/1960 | Sorenson |
| 3,635,049 A | 1/1972 | Schlotmann et al. |
| 4,312,193 A | 1/1982 | Gibbs et al. |
| 4,411,635 A | 10/1983 | Boothroyd et al. |
| 4,947,972 A | 8/1990 | Lea |
| 6,283,868 B1 | 9/2001 | Clarke et al. |
| 6,718,745 B1 | 4/2004 | Adams |
| 2006/0021316 A1 | 2/2006 | Harkcom |
| 2007/0099712 A1 | 5/2007 | Smihal |

*Primary Examiner* — Aaron Dunwoody
(74) *Attorney, Agent, or Firm* — Patrick M. Sheldrake; Michael G. Harms

(57) ABSTRACT

A shock protection device having opposing pluralities of frangible splines separated by an annular groove disposed in an internal splined opening in a drive hub, the splines for intermeshing engagement with a splined end of a drive shaft for transferring rotary motion to a cutter head from a driveline. Variation in the width of the annular groove enables precise adjustment of the fracture torque for the shock protection device beyond the adjustment possible through variation in the number or configuration of the individual splines.

19 Claims, 3 Drawing Sheets

ANNULAR GROOVE IN A SHOCK PROTECTION DEVICE

CROSS-REFERENCE TO RELATED APPLICATIONS

This application claims the benefit of priority of U.S. Provisional Application 60/975,943, filed Sep. 28, 2007.

BACKGROUND OF THE INVENTION

The present invention relates generally to mechanisms for protecting mechanical drive components from overloads, and more particularly relates to a shear device coupled between components of an agricultural disc mower that protects the various components of the mower in the event a cutterhead strikes an object and creates an overload condition in the driveline.

Typical disc cutterbars used in agriculture include an elongated housing containing a train of meshed idler and drive spur gears, or a main power shaft or a series of shafts coupled by respective bevel gear sets, for delivering power to respective drive shafts for cutterheads spaced along the length of the cutterbar. The cutterheads each comprise a cutting disc including diametrically opposed cutting blades (though configurations with three or more blades are known) and having a hub coupled to an upper end of a drive shaft, the lower end of the drive shaft carrying a spur gear in the case where a train of meshed spur gears is used for delivering power, and carrying a bevel gear of a given one of the bevel gear sets in the case where a main power shaft is used. In either case, as would be expected, bearings are used to support the various shafts. The cutterheads are rotated at a relatively fast speed making the drive components, such as gears, bearings, and shafts vulnerable to damage in the event that the unit strikes a foreign object.

In order to minimize the extent of such possible damage to the drive components, it is known to incorporate a shear device somewhere in the drive of each unit which will "fail" upon a predetermined overload being imposed on the device. As used herein with reference to shear devices, the terms "fail" or "failing" are intended to cover the actual function of such devices, i.e., shearing, fracturing, breaking and the like.

One known type of shear mechanism employs frangible splines engaged on an interfacing splined shaft. The shear device is in the form of either a collar or clamping member having internal splines received on a splined end of the drive shaft. An overload situation preferably causes the splines in the shear device to shear and the continuing transfer of rotational power to cease. Variation of the overload situation (shear torque) at which the internal splines shear is accomplished through variation in the number, profile (height), length, or material of the splines. Such means often lack the precision necessary to achieve the desired shear torque needed for optimal rotary cutter shock protection or cause other operational problems when a low shear torque threshold is required. For example, use of spline length as a means for shear torque variation can result in a shock hub that is unstable when mounted on a shaft due to insufficient spline engagement length. Variations in the number of splines increase production costs as unique tooling may be necessary to provide the desired variations.

It would be advantageous to have a driveline shock protection device having improved capability to precisely establish a pre-determined shear torque value without compromising the operation or production cost of a driveline shock hub that overcomes the above problems and limitations.

SUMMARY OF THE INVENTION

Accordingly, it is an object of the present invention to provide a shock protection device for a driveline that will prevent the transfer of power along the driveline in the event of an overload.

It is a further object of the present invention to provide a driveline shock protection device having capability to establish a selectively pre-determined overload torque value with improved precision.

It is a further object of the present invention to provide a driveline shock protection device incorporating an annular groove in the internal splines that allows for precise variation in strength of the frangible spline elements.

It is a further object of the present invention to provide a driveline shock protection device in which an annular groove in the internal splines enables precise adjustment of the effective spline length with no change required to external mating components.

It is a further object of the present invention to provide a driveline shock protection device in which an annular groove in the internal splines enables precise adjustment of the effective spline length with no tooling changes required.

It is a still further object of the present invention to provide an annular groove in a shock protection device that enables greater precision in effective spline length than is provided by varying the number of splines in the device.

It is a still further object of the present invention to provide an improved shock protection device incorporating an annular grove in an internal spline that is durable in construction, inexpensive of manufacture, carefree of maintenance, easily assembled, and simple and effective to use These and other objects are achieved in accordance with the instant invention by providing a shock protection device having opposing pluralities of frangible splines separated by an annular groove in the internal splined opening in a hub, the splines for intermeshing engagement with a splined end of a drive shaft for transferring rotary motion to a cutter head from a drive line, variation in the width of the annular groove enabling precise adjustment of the fracture torque for the shock protection device.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
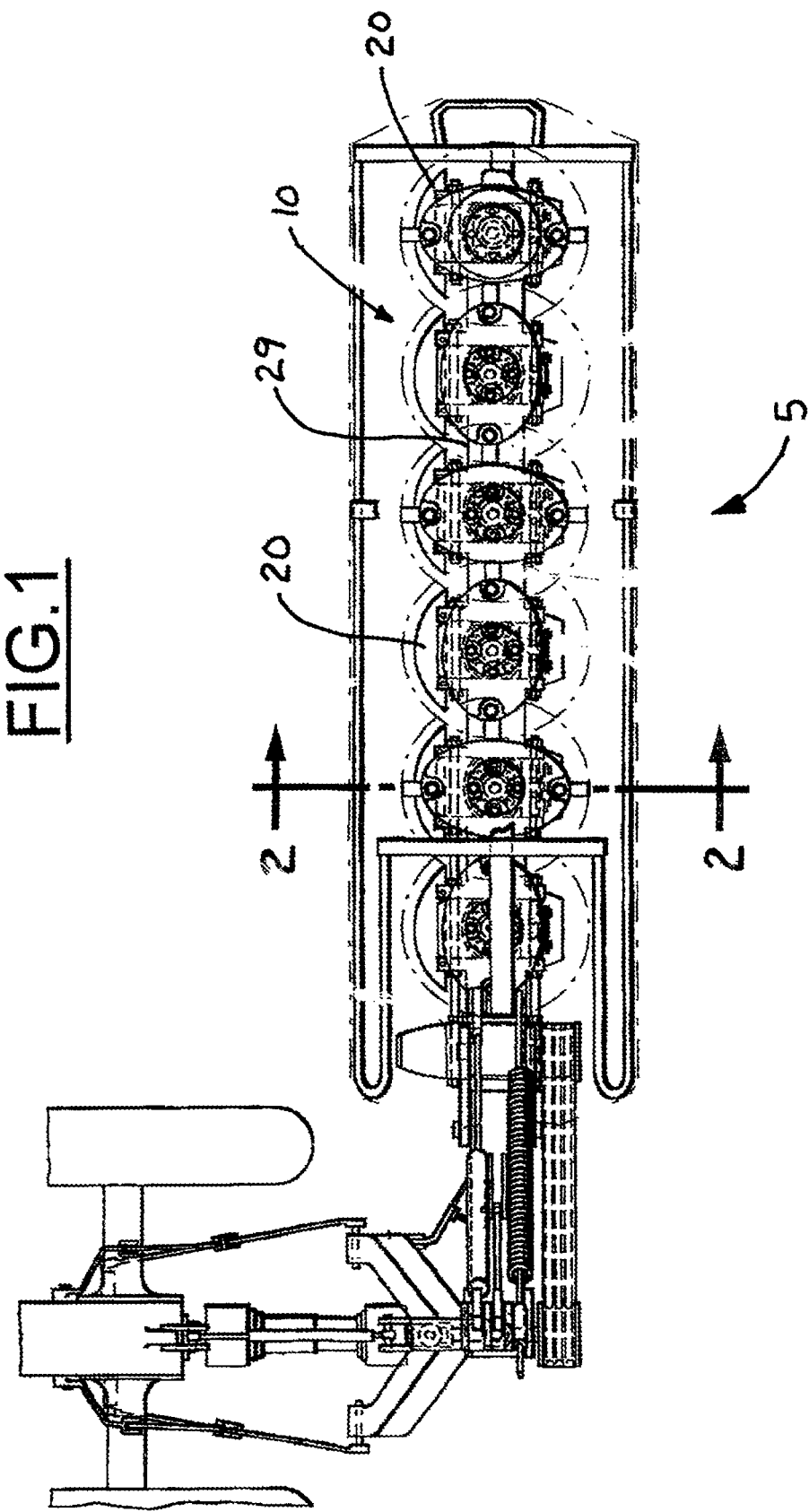
FIG. 1 is a top plan view of a disc mower mounted on the three-point hitch of a tractor, the disc mower having a modular disc cutterbar featuring a plurality of disc cutterhead modules, each module incorporating the principles of the instant invention.

Referring now to the drawings and particularly to FIG. 1, wherein a plan view of a typical modular rotary disc mower 5 having a cutterbar 10 featuring a plurality of individual disc cutterhead modules 20, each module incorporating the principles of the present invention is presented. Cutterbars of this type are used on hitch-mounted, pull-behind, and self-propelled mowers and are generally well-known in the art. For background information on the structure and operation of an exemplar rotary disc cutterbar, reference is made to U.S. Pat. No. 4,815,262, issued to Koch, and U.S. Pat. No. 5,761,890, issued to Lehman et al., the descriptive portions thereof being incorporated herein in full by reference.

Figure 2:
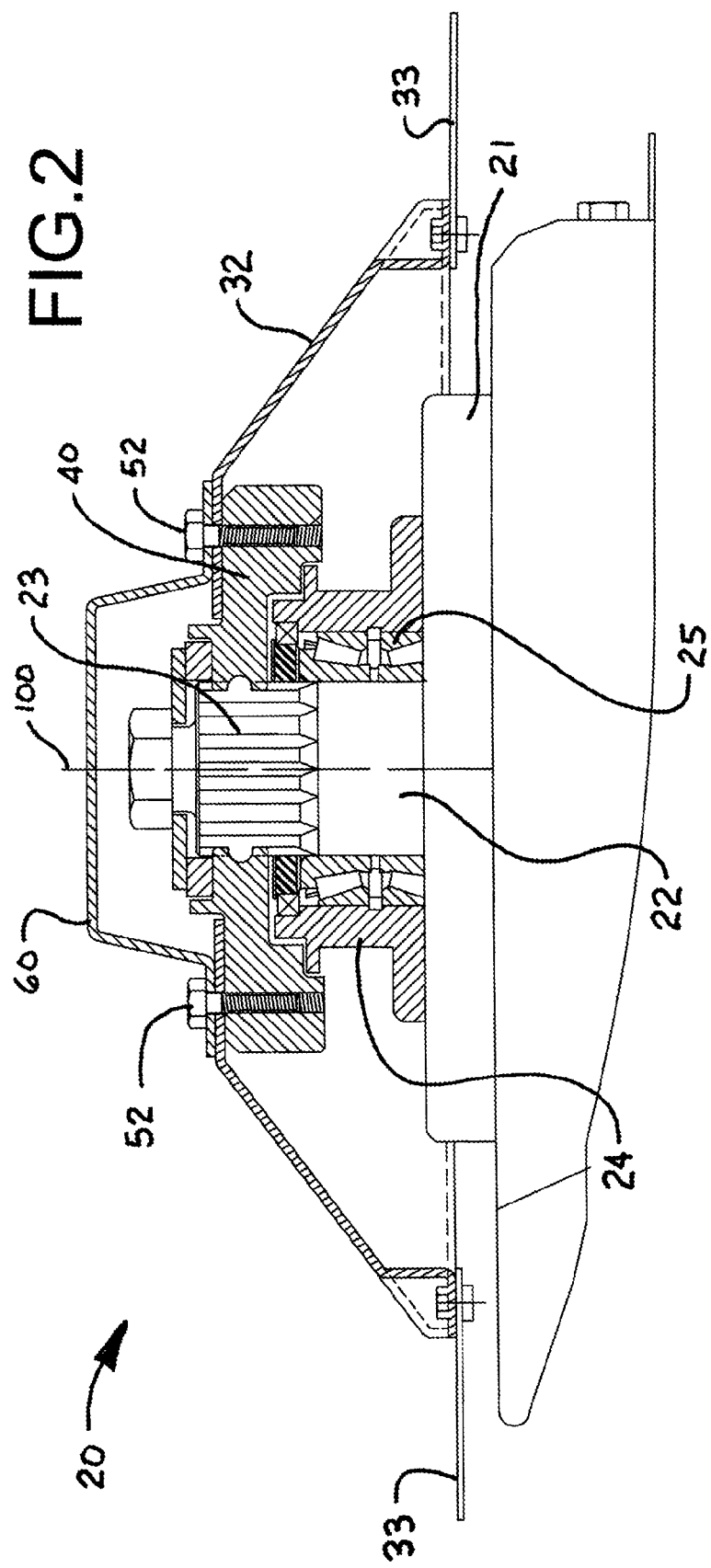
FIG. 2 is a cross-sectional view of a single cutterhead module taken along line 2-2 of FIG. 1 showing the splined shaft and shock hub interface.

Modular cutterbar 10 is formed from alternating cutterhead modules 20 and spacer modules 29. Each cutterhead module 20, as best seen in FIG. 2, includes a hollow cast housing 21 having a shape to retain a low profile and to establish an oil reservoir therewithin. Cutterheads 20 are gear driven and assembled in such a manner as to establish a specific timing relationship between adjacent units. More particularly, the cutterheads are arranged such that the knives 33 on adjacent units have overlapping cutting paths, but do not come into contact with each other. Failure to maintain this timed relationship during operation will result in one unit hitting the adjacent unit(s), damaging the cutterheads (and possibly initiating a chain reaction that damages all cutterheads), the drive train of the cutterbar and/or connected prime mover.

Figure 3:
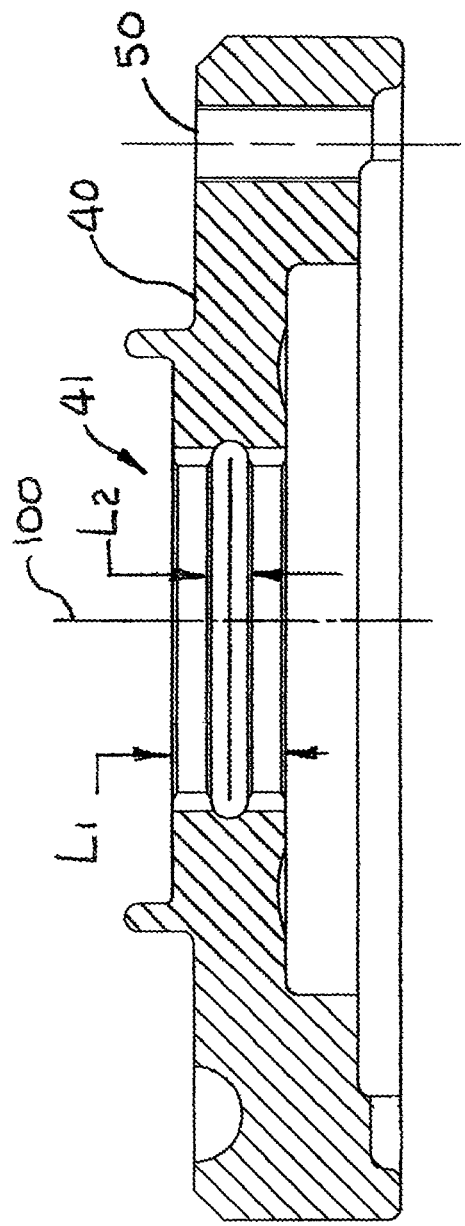
FIG. 3 is a cross-sectional view of the shock hub.
Figure 4:
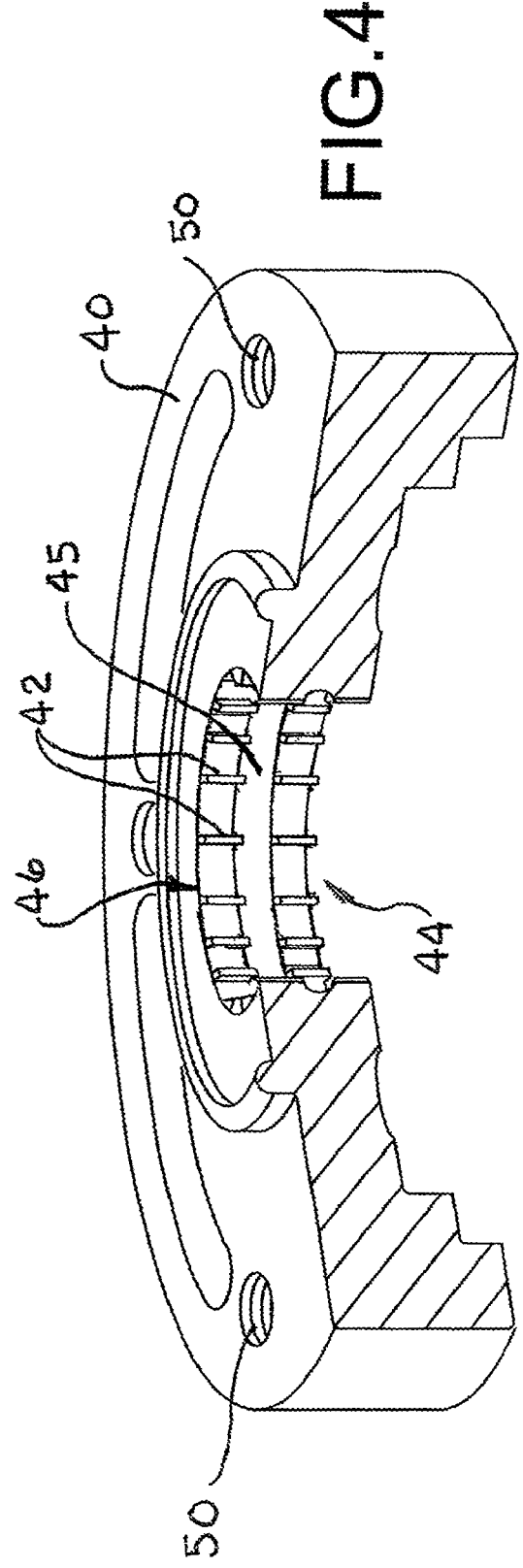
FIG. 4 is a perspective view of the shock hub with a breakout showing the annular groove.

Now referring to FIGS. 2 through 4, each cutterhead module 20 features a stationary base 21 which allows the module to be mounted on the cutterbar and houses an interconnecting driveline to provide motive power to each module. Each module 20 includes a generally vertically oriented drive shaft 22 interconnecting the driveline for driving the individual rotating head 32 and connected knives 33 of each module. The drive shaft 22 is positioned along a rotational centerline 100 which serves as the principal reference axis for the module 20 and shock hub 40. Drive shaft 22 features external splines 23 for engagement with shock hub 40 which rotationally interconnects drive shaft 22 and rotating head 32. While involute splines are shown, square splines or similar structures may be utilized to provide a torque-transferring interaction between the drive member, namely drive shaft 22, and the driven member, namely rotating head 32, through interconnecting shock hub 40 and are contemplated within the scope of this invention. The shock hub 40 provides an easily replaceable apparatus in the driveline to prevent shock impact loads caused when the cutter knives 33 impact a rock or other immovable object from damaging the cuterbar driveline or other portions of the power transfer apparatus. Establishing an overload or breakaway torque for the shock hub 40 that is lower than the torque at which damage to the external splines 23 or other portions of the driveline occurs and is a well known method for protecting drivelines from momentary torque increases (shock or impact) commonly occurring as a cutter blade strikes an immovable object or a heavy movable object such as a rock. The breakaway torque may be varied through material selection for the shock hub, the size of each spline, the number of internal splines, or the effective (engaged) length of the splines.

Shock hub 40 is a generally flat, disk-like structure having an internal opening 41 for receiving drive shaft 22 and an outer periphery which includes mounting structures 50 for connecting the rotating cutting head 32. It is also advantageous to provide a protective debris cover 60 to reduce accumulation of debris near the driveline components. Debris cover 60 may also be connected by mounting structures 50. The internal opening 41 of shock hub 40 includes a plurality of frangible engagement structures 42, hereinafter referred to as splines 42. The splines 42 are arranged about the interior circumference or base perimeter of the opening 41 and extend radially inwardly from the base perimeter for a height. The splines 42 are generally uniformly positioned about the circumference so as to evenly distribute drive stresses within the hub 40. The number of internal splines 42 may be varied to provide a desired breakaway torque for the hub, that is, the torque which will shear the internal splines from the interior surface of opening 41. Variation in material, alteration of the spline configuration, including the number of splines, additionally allow for variation of the desired breakaway torque. However, it is not always practical to achieve the desired breakaway torque for the shock hub within the constraints of these design parameter variations.

The solution is to incorporate an annular groove 45 in the internally splined portion of the hub 40 so that the effective length of the frangible internal splines 42 engaging the drive shaft 22 may be varied while still providing sufficient hub support width (dimension $L_1$ in FIG. 3) to resist bending in the spline-shaft interface. Annular groove 45 is machined into the internal splines 42 to reduce the effective engagement length of the internal and external splines. Preferably, the depth of the groove will be at least as much as the projection height of the splines from the base perimeter surface of opening 41. The depth of annular groove may also be greater than the spline protrusion above the base perimeter surface of opening 41 thereby creating a groove which extends outwardly radially beyond the base perimeter surface of the opening into the surrounding hub material thereby providing a space for receiving fragments of the frangible splines and limiting the potential for damage to the shaft external splines. In either case, the purpose of the groove is to limit the effective spline length and thus the interaction between the interfacing splines. The width of annular groove, shown as $L_2$ in FIG. 3, allows the overall length of the internal splines 42 to be easily adjusted as the effective spline length of the internal splines 42 is length $L_1$ less length $L_2$. Additionally, it is permissible to provide a groove in only a portion of the inner circumference of the opening so that the groove is not fully annular, though machine operations of such a configuration would be more complex that those to create an annular groove.

The effective spline length is comprised of two portions 44, 46, one on either side of the annular groove 45. Resistance to bending at the shaft-hub interface is necessary to prevent the hub 40 from rocking on the drive shaft 22 as this interface supports the hub 40. By positioning the engaged portions of the frangible internal splines 42 on either side of the annular groove 45, an effective hub support width is provided which is capable of preventing rocking of the hub on the drive shaft 22. Both portions 44, 46 must engage the external splines 23 of the drive shaft 22 to provide the necessary stability for the hub 40 and the desired overload torque capability.

Using the present invention allows spline configurations (e.g., number, profile) common for a wide array of applications to be used, thereby simplifying machining operations (broaching). A common shock hub wherein the number of internal splines is selected to withstand a breakaway torque in excess of the desired breakaway torque can be produced. The breakaway torque capability is thus reduced by reducing the effective engaging length of the splines 42 through addition of the annular groove 45, in essence removing a portion of the spline length. The width of the annular groove 45 can be easily varied using standard machining processes allowing the effective engaging length of the splines to be easily varied.

An added benefit of the annular groove 45 is that fragments of the splines 42 that are generated when the shock hub 40 shears in response to an impact by the cutters may migrate into the groove rather than being retained in the shaft splines where they might damage the external splines of the drive shaft. Furthermore, providing an annular groove 45 that extends radially beyond the base perimeter of opening 41 for a distance at least as great as the anticipated fragment size assures that the fragments generated by the frangible splines 42 can fully migrate out of the drive shaft/shock hub interface further reducing the potential for damage. As the shock hub is designed to be the weak link in the drive line, features that further protect the integrity of remaining components are beneficial in controlling component damage and thereby overall operating costs of the machine.

Naturally, the invention is not limited to the foregoing embodiments, but it can also be modified in many ways without departing from the basic concepts. It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A shock protection apparatus for use in a driveline for rotationally connecting drive and driven members of the driveline, said apparatus comprising:
    a driveline including a drive member having an external spline structure;
    a hub having a generally opposing first and second sides and a rotational centerline;
    a cylindrical opening in said hub for receiving said drive member, said opening extending between said first and second sides and aligned with said rotational centerline,
    a plurality of internal frangible spline structures disposed on the interior surface of said cylindrical opening in engagement with the external spline structure of the drive member for torque transferring, each of said plurality of spline structures having a length along said rotational centerline extending from said first side to said second side and a height measured radially, the drive member engaging said opening for substantially said length; and
    a groove positioned in said cylindrical opening, said groove extending around at least a portion of the circumference of said cylindrical opening, a plane defined by said groove being generally perpendicular to said rotational axis, said groove further having a width measured parallel to said rotational axis and a depth measured perpendicularly to said rotational axis thereby dividing one or more of said plurality of spline structures into first and second portions, wherein both portions of the spline are positioned and configured for generally concurrent shearing upon receiving a predetermined threshold breakaway torque from the drive member.

2. The shock protection apparatus of claim 1, wherein said groove is an annular groove extending around the circumference of said cylindrical opening.

3. The shock protection apparatus of claim 1, wherein said hub has both an upper and lower portion, each hub portion adjacent the first and second side of the hub respectively, wherein both portions of the spline and the groove are located in the same hub portion.

4. The shock protection apparatus of claim 1, wherein hub has both an upper and lower portion, each hub portion adjacent the first and second side of the hub respectively, wherein both portions of the spline and the groove are located in the same hub portion and the opposite portion the hole forms portion of a larger cavity through which a portion of a cutterhead module is inserted.

5. A cutterbar for an agricultural harvester, comprising:
    a rotary cutterhead module having a drive shaft for transferring rotary motion from a driveline to a rotating cutterhead, the drive shaft having a rotational centerline and a splined end,
    the shock protection apparatus having a hub interconnecting the rotating cutterhead and said splined end, said hub having generally opposing first and second side surfaces;
    an opening in said hub for receiving said splined end, said opening aligned on the rotational centerline and extending through said hub from said first side surface to said second side surface defining a length therebetween, said opening further having a perimeter surface;
    a first plurality of frangible splines positioned about said perimeter adjacent to said first side surface for engagement with said splined end;
    a second plurality of frangible splines positioned about said perimeter adjacent to said second side surface, for concurrent engagement with said splined end thereby stabilizing said hub relative to the drive shaft; and
    an annular groove in said perimeter separating said first and second pluralities of torque-transmitting structures, said annular groove having a width in a direction parallel to the rotational axis and a depth in a direction perpendicular to the rotational axis.

6. The cutterbar of claim 5, wherein said depth of said groove extends substantially through said internal spline structure to said perimeter surface.

7. The cutterbar of claim 5, wherein said depth of said groove extends radially outwardly beyond said perimeter surface.

8. The cutterbar of claim 5, wherein said first and second pluralities of frangible splines are involute splines.

9. The cutterbar of claim 5, wherein both sets of splines are positioned and configured to shear concurrently.

10. The cutterbar of claim 5, wherein said annular groove is positioned generally symmetrically within said length of said opening.

11. The cutterbar of claim 6, wherein said annular groove is positioned generally symmetrically within said length of said opening.

12. A method of selectively adjusting the breakaway torque of an overload protective hub in a rotating driveline, the method comprising the steps of:
provproviding an elongate generally cylindrical drive member having a first end with a torque-transferring structure, the drive member rotatable about a central axis;
providing a driven member rotatable by the drive member;
p1 providing an overload protective hub interconnecting the drive and driven members for rotation therewith, the hub having generally opposing first and second sides separated by a first dimension;
providing a cylindrical opening in the protective hub extending from the first side to the second side, the cylindrical opening being aligned on the central axis and defining a root perimeter;
providing a first plurality of elongate frangible engagement structures arranged about the cylindrical opening adjacent to the first side, aligned parallel to the central axis defining a first effective length and extending radially inwardly from the root perimeter;
providing a second plurality of elongate frangible engagement structures arranged about the cylindrical opening adjacent to the second side, aligned parallel to the central axis and defining a second effective length and extending radially inwardly from the root perimeter, the combination of the effective lengths of the first and second pluralities of frangible engagement structures determining a breakaway torque capacity for the protective hub when said first and second pluralities of engagement structures are engaged with the torque transferring structure;
providing an annular groove in the cylindrical opening positioned between the first and second plurality of frangible drive structures, the groove having a width in a direction parallel to the central axis;
determining a desired breakaway torque value; and
varying the width of the annular groove thereby altering the first and second effective lengths such that the breakaway torque capacity of the protective hub may be selectively varied.

13. The method of claim 12, wherein the torque transferring structure is a plurality of splines.

14. The method of claim 13, wherein the first and second pluralities of frangible engagement structures are splines intermeshing with the drive member plurality of splines.

15. The method of claim 14, wherein the number of splines in the first and second pluralities of frangible engagement structures is not equal to the number of splines on the drive member.

16. The method of claim 14, wherein the step of providing an annular groove further includes the step of positioning the annular groove between the splines such that increasing the size of the groove reduces the lengths of the splines at the ends of the splines adjacent the groove.

17. The method of claim 16, wherein the step of providing an annular groove further includes the step of providing a groove having a depth generally equal to a height of the first and second pluralities of frangible engagement structures extending inwardly from the base perimeter.

18. The method of claim 16, wherein the step of providing an annular groove further includes the step of providing a groove having a depth extending outwardly beyond the base perimeter.

19. The method of claim 18, wherein the step of providing an annular groove having a depth extending outwardly beyond the base perimeter further includes the step of extending the depth sufficient to receive a largest expected fragment of the frangible engagement structure.

* * * * *